United States Patent Office 3,165,515
Patented Jan. 12, 1965

3,165,515
UNSATURATED TRIAZINE COMPOUNDS
Gaetano F. D'Alelio, South Bend, Ind., assignor, by direct and mesne assignments, to Dal Mon Research Co., Cleveland, Ohio, a corporation of Delaware
No Drawing. Filed Sept. 26, 1962, Ser. No. 226,468
29 Claims. (Cl. 260—248)

This invention relates to derivatives of symmetrical triazine. More specificially, it relates to triazine compounds of the formula

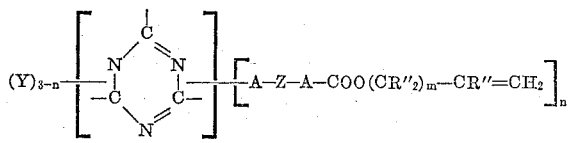

wherein:
$n$ is an integer having a value of at least 1 and no greater than 3;
A is a bivalent radical selected from the group of O and NR' where R' is hydrogen or an alkyl, aryl, or cycloalkyl radical of no more than 12 carbon atoms;
Z is a divalent radical selected from the class consisting of divalent, aliphatic, cycloaliphatic and aromatic radicals predominantly hydrocarbon and having no more than 18 carbon atoms therein;
R" is a radical selected from the class consisting of hydrogen, halogen, and alkyl, cycloalkyl and aryl radicals having no more than 10 carbon atoms therein;
$m$ is 0 or 1;
Y is a monovalent radical, preferably one selected from the class consisting of hydrogen, hydrocarbon, halogen, R'''O—, R'''S—, R'''$_2$N—, wherein R''' is hydrogen or a hydrocarbon radical preferably of no more than 18 carbon atoms.

Compounds of the above structure are referred to hereinafter as triazinyl compounds or triazine monomers. For purposes of simplicity the trivalent 1,3,5 triazine or symmetrical triazine nucleus is represented herein as $C_3N_3$.

While the applicant's copending application Serial No. 764,250, filed September 30, 1958 issued October 2, 1962, as Patent No. 3,056,760, of which this application is a continuation-in-part, discloses and claims polymerization products from a broad class of triazine compounds including certain of the triazine compounds of this invention, the compounds of this invention are suited to various other compositions and uses. For example, they can be used as chemical intermediates, e.g., by addition of halogen to the ethylenic group to give fire-retardants, inhibitors, rust preventatives, tanning agents, crosslinking agents for addition polymers, monomers for condensation polymers, etc.

The symbol A represents a biradical selected from the class of oxygen and —NR'— in which R' is selected from the class consisting of hydrogen and hydrocarbon radicals, such as: alkyl, aryl, alkaryl, aralkyl, cyloaliphatic, heterocyclic radicals, etc., as well as their halogenated, acetoxy, alkoxy, aryloxy, alkaryloxy, aralkoxy, etc., substitution derivatives, e.g., phenethyl, methyl, ethyl, propyl, butyl, amyl, hexyl, octyl, dodecyl, ethoxyethyl, vinyl, allyl, crotyl, cyclohexyl, cyclohexenyl, phenyl, tolyl, benzyl, naphthyl, pyridyl, chlorophenyl, methoxy phenyl, pentachlorophenyl, acetoxynaphthyl, fluoronaphthyl, ethoxynaphthyl, butyroxphenyl, etc. For reasons of availability and economy, R' is preferably hydrogen, methyl, or ethyl.

Typical examples of the group

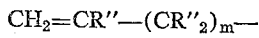

are:

$CH_2=CH-$; $CH_2=C-$; $CH_2=C-$; $CH_2=CH-CH_2-$
$\quad\quad\quad\quad\quad\quad\quad |$ $\quad\quad |$
$\quad\quad\quad\quad\quad\quad\quad CH_3$ $\quad C_6H_4$ $CH_2=C-CH_2-$; $CH_2=CH-CH-$; $CH_2=CH-C-$
$\quad | \quad\quad\quad\quad\quad\quad\quad | \quad\quad\quad\quad\quad\quad | $
$\quad CH_3 \quad\quad\quad\quad\quad\quad CH_3 \quad\quad\quad\quad\quad CH_3$ $CH_2=C-CH_2-$; $CH_2=CH-CH-$; $CH_2=C-CH-$; $CH_2=C-$
$\quad | \quad\quad\quad\quad\quad\quad\quad | \quad\quad\quad\quad\quad | \quad\quad\quad\quad | $
$\quad C_6H_4 \quad\quad\quad\quad\quad C_6H_{11} \quad\quad\quad CH_3CH_3 \quad\quad C_6H_5$ $CH_2=CH-CH-$; $CH=C-CH_2-$; $CH_2=CH-CH-$
$\quad\quad\quad\quad | \quad\quad\quad\quad\quad\quad | \quad\quad\quad\quad\quad\quad\quad | $
$\quad\quad\quad\quad C_6H_5 \quad\quad\quad\quad Cl \quad\quad\quad\quad\quad\quad Cl$ $\quad\quad Cl$
$\quad\quad |$
$CH_2=CH-C-$; $CH_2=CH-CH-$; $CH_2=CH-CH-$; etc.
$\quad\quad |$ $\quad\quad\quad\quad\quad\quad\quad | \quad\quad\quad\quad\quad\quad\quad |$
$\quad\quad Cl \quad\quad\quad\quad\quad\quad\quad C_4H_9 \quad\quad\quad\quad\quad C_2H_5$ Preferably, because of the ease of polymerizability, R" is hydrogen, as for example, in $CH_2=CH-$ and $CH_2=CHCH-$.

R" represents hydrogen or a halogen, e.g., Cl, Br, I or F, or a saturated or unsaturated monovalent hydrocarbon radical, such as the aliphatic, cycloaliphatic, aryl, aliphatic-substituted aryl and aryl-substituted aliphatic, etc. radicals, for example, methyl, ethyl, vinyl, ethynyl, propyl, allyl, propargyl, butyl, methallyl, butenyl, amyl, hexyl, octyl, crotyl, cyclopentyl, cyclopentenyl, cyclohexyl, cyclohexenyl, cycloheptyl, phenyl, diphenyl, xenyl, napthyl, antracyl, tolyl, xylyl, ethylphenyl, propylphenyl, isopropylphenyl, allyl phenyl, 2-butenyl-phenyl, propenylphenyl, t-butylphenyl, methylnaphthyl, benzyl, cinnamyl, phenylethyl, phenylpropyl, etc.

In the triazinyl vinyl monomers of this invention Z is a divalent hydrocarbon radical and includes, for example, divalent aliphatic radicals, aromatic radicals, cycloaliphatic radicals, etc., including various combinations of such radicals, such as alkaryl, aralkyl, etc., including diaryl oxides, diaryl sulfides, diaryl amines, etc., all of which radicals can also have substituents thereon such as chloro, fluoro, alkoxy, aryloxy, acyloxy, etc. groups. Illustrative examples of divalent radicals that Z can represent in the above formula are:

$-CH_2CH_2-$; $-CH_2CH_2CH_2-$; $-CH_2CH_2CH_2CH_2-$
$-CH_2-CH-$; $-(CH_2)_6-$; $-CH_2-CH-$; $-CH-CH_2-$
$\quad\quad\quad |$ $\quad\quad\quad\quad\quad\quad\quad\quad | \quad\quad\quad |$
$\quad\quad CH_3$ $\quad\quad\quad\quad\quad\quad\quad C_6H_5 \quad C_2H_5$ $-CH-CH_2CH_2-$; $-CH_2-CH-CH_2-$; $-CH_2-CH_2-CH-$
$\quad |$ $\quad\quad\quad\quad\quad\quad\quad\quad |$ $\quad\quad\quad\quad\quad\quad |$
$CH_3$ $\quad\quad\quad\quad\quad\quad\quad CH_3$ $\quad\quad\quad\quad\quad C_2H_5$ $-CH_2CH-$; $-CH_2-CHCH_2-$; $-CH_2C_6H_4-$; $-CH_2-C_{10}H_6-$
$\quad\quad |$ $\quad\quad\quad\quad |$
$\quad C_2H_5 \quad\quad\quad C_6H_5$ $-CH_2-CH-CH_2-$; $-CH_2-CH-CH_2-$; $-CH_2-CH-CH_2-$
$\quad\quad\quad |$ $\quad\quad\quad\quad\quad\quad |$ $\quad\quad\quad\quad\quad\quad |$
$\quad\quad OCOCH_3 \quad\quad\quad OCOC_6H_5 \quad\quad\quad OC_2H_5$ $\quad\quad CH_2CH_2$
$\quad\quad /\quad\quad \backslash$
$-CH\quad\quad CH-$; $-CH_2-CH-CH_2-$; $-CH_2-CH-CH_2-$
$\quad\quad \backslash\quad\quad /$ $\quad\quad\quad\quad\quad |$ $\quad\quad\quad\quad\quad |$
$\quad\quad CH_2CH_2$ $\quad\quad\quad\quad\quad F$ $\quad\quad\quad\quad\quad Cl$ $-CH_2-CH-$; $-CH_2CH-$; $-CH_2-CH-$
$\quad\quad\quad |$ $\quad\quad\quad\quad |$ $\quad\quad\quad\quad |$
$\quad\quad C_6H_4Cl \quad\quad C_6H_4CH_2F \quad CH_2F$ $-CH_2-CH=CH-CH_2-$; $-C_6H_4-$; $-C_6H_3-$; $-C_6H_2(CH_3)_2-$
$\quad\quad\quad\quad\quad\quad\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad\quad\quad\quad\quad\quad CH_3$ $-C_{10}H_6-$; $-C_{10}H_6-$; $-C_6H_3-$; $-C_6H_4-C_6H_4-$; $-C_6H_3-$
$\quad\quad\quad\quad\quad |$ $\quad\quad\quad |$ $\quad\quad\quad\quad\quad\quad\quad\quad\quad\quad\quad |$
$\quad\quad\quad\quad CH_3 \quad\quad C_2H_5 \quad\quad\quad\quad\quad\quad\quad\quad\quad Cl$ $-C_6H_3-C_6H_4-$; $-C_{10}H_5-$; $-C_6H_3-$; $-C_6H_3-$; $-C_6H_4CH_2-$
$\quad |$ $\quad\quad\quad\quad\quad\quad |$ $\quad\quad |$ $\quad\quad\quad\quad |$
$\quad Cl \quad\quad\quad\quad\quad C_2H_5 \quad COOCH_3 \quad OCOCH_3$ $-CH_2C_6H_4CH_2-$; $-CH-C_6H_3-$; $-CH-C_{10}H_6-$; $-CH_2-C_6H_3-$
$\quad\quad\quad\quad\quad\quad\quad\quad |$ $\quad\quad\quad\quad\quad |$ $\quad\quad\quad\quad\quad\quad |$
$\quad\quad\quad\quad\quad\quad CH_3CH_3 \quad OCOCH_3 \quad\quad OCH_3$

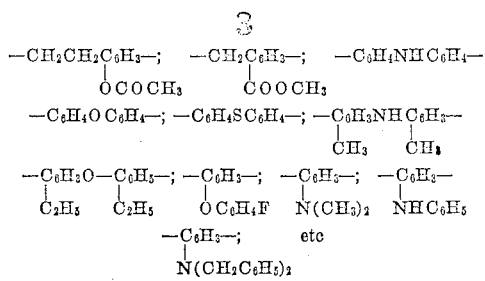

The substituent groups such as the alkoxy, aryloxy, acyloxy, alkylamino, arylamino, etc., radicals are advantageously radicals of no more than about ten carbon atoms, such as methoxy, ethoxy, butoxy, pentoxy, oxtoxy, phenylmethoxy, phenylethoxy, acetoxy, propionoxy, butyroxy, valeroxy, capryloxy, benzoxy, phenylacetoxy, toluoxy, etc. Other groups, such as nitroso, nitro, etc., can also be used as substituents on the Z group provided they are inert during the preparation and use of the triazinyl vinylmonomer. The aliphatic group, or that portion of the Z group which is aliphatic, can be saturated or unsaturated, e.g., —CH$_2$—CH=CH—;

—CH$_2$—CH=CH—CH

—C≡C; —CH$_2$CH=CH—CH=CH—CH$_2$—; etc. Also, without departing from the spirit of this invention, the carbon atoms in the divalent radical, Z, can be interrupted by an atom other than carbon, e.g.,

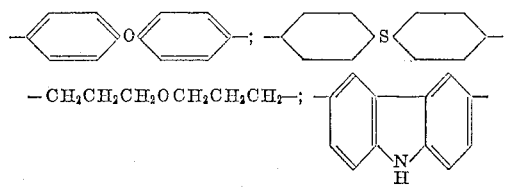

etc.

While other hydrocarbon and substituted hydrocarbon groups are also effective as Z groups, the groups indicated above are preferred for reasons of availability and economy.

The triazinyl vinyl compounds of this invention can be written as $(M)_n(C_3N_3)(Y)_{3-n}$ in which M represents the radical containing the polymerizable group, and the other symbols are as defined above. Where the monomer contains only one polymerizable group, soluble, fusible polymers can be obtained. When the monomer contains two polymerizable groups, that is $(M)_n$ is $(M)_2$ and the remaining or third group is the same or different from the M group, insoluble, infusible polymers can be produced therefrom. When $(M)_n$ is $(M)_2$, insoluble, infusible polymers and copolymers can still be obtained where the Y group is any other polymerizable or non-polymerizable monovalent radical.

For example, Y can be hydrogen and alkyl, aryl, aralkyl, alkaryl, cycloaliphatic and heterocyclic groups and their chloro, fluoro, alkoxy, aryloxy, acyloxy derivatives, such as methyl, ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl propyl, acetoxy benzyl, ethoxy propyl, methyl naphthyl, vinyl, allyl, methallyl, allyl phenyl, etc., radicals; Y can also be hydroxyl and the alkoxy and aryloxy radicals derived from aliphatic, cycloaliphatic, aromatic and heterocyclic hydroxy compounds such as methyl alcohol, ethyl alcohol, isopropyl alcohol, butyl alcohol, isobutyl alcohol, decyl alcohol, phenol, the o-, m-, and p-cresols, the xylenols, naphthols, ethylene glycol, methyl glycol ether, butyl glycol ether, glycerine, penta erythritol, hydroxy naphthalene, hydroxy pyridine, as well as the alkoxy and aryloxy radicals of hydroxy acids and esters such as lactic acids, ethyl lactate, salicylic acid, methyl salicylate; and in addition Y can be an amino group, NH$_2$ or the radical of a mono- or disubstituted amino group, for example, the radicals derived from ethyl amine, methyl amine, butyl amine, nonyl amine, dimethyl amine, aniline, naphthyl amine, ethanol amine, diethanolamine, diisopropanol amine, methyl aniline, piperidine, amino pyridine, hydrazine, symmetrical dimethyl hydrazine, unsymmetrical dimethyl hydrazine, as well as the radicals of the amino-acids, amino-amides, amino-nitriles, specific examples of which are:

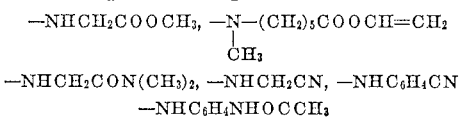

—NHCH$_2$CON(CH$_3$)$_2$, —NHCH$_2$CN, —NHC$_6$H$_4$CN
—NHC$_6$H$_4$NHOCCH$_3$ the radicals of semicarbazide and substituted semicarbazides, such as semicarbazide itself, 4-methyl semicarbazide, etc., as disclosed in my U.S. Patent No. 2,295,565, issued September 15, 1942; the guanazo radical which is attached to the triazine ring by reacting dicyandiamide with a hydrazino triazine as shown in my U.S. Patent No. 2,295,567, issued September 15, 1942; the radicals of urea and substituted ureas, such as —NHCONH$_2$, CH$_3$NHCONH—, etc., which may be attached to the triazine ring as shown in my U.S. Patent No. 2,312,688, issued March 2, 1943; radicals of aminoaryl sulphonamides, e.g.

—NHC$_6$H$_4$SO$_2$NH$_2$

—NHC$_6$H$_4$SO$_2$NHCH$_3$, etc. as shown in my U.S. Patent No. 2,312,697, issued March 2, 1943; radicals of acyl hydrazine and substituted hydrazines, such as

CH$_3$CONHNH—

C$_2$H$_5$CONHNC$_6$H$_5$—, C$_6$H$_5$SO$_2$NHNH$_2$, etc.; radicals of alkylene amines, such as

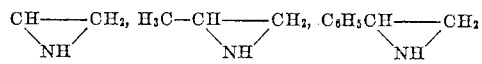

Y can also be the polymerizable radical of the acrylic, methacrylic, chloroacrylic ester or amide of amine alcohols or dialcohols and diamines, e.g.,

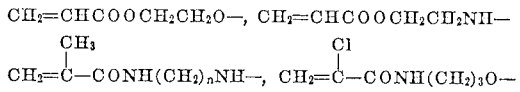

etc.; the radicals of polymerizable aminated or hydroxylated alkylene aryl compounds, for example,

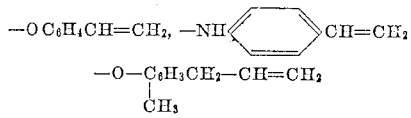

etc.; the radicals of malonic and substituted malonic esters, nitriles and amides, e.g.,

—HC—(COOCH$_3$)$_2$, —HC(COOCH$_2$CH=CH$_2$)$_2$, —CH(CN)$_2$

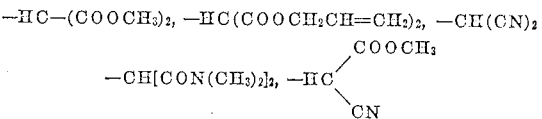

etc.; the $$-\overset{O}{\underset{\|}{P}}-(OR)_2$$

radical such as

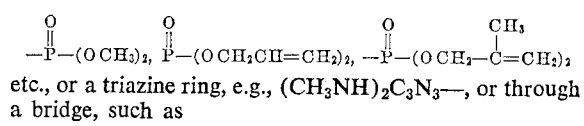

etc., or a triazine ring, e.g., (CH$_3$NH)$_2$C$_3$N$_3$—, or through a bridge, such as

[(CH$_3$)$_2$N]$_2$(C$_3$N$_3$)NH—CH$_2$CH$_2$NH—

(C$_2$H$_5$NH)$_2$(C$_3$N$_3$)—OCH$_2$CH$_2$O—

(HO)$_2$(C$_3$N$_3$)NHCH$_2$CH$_2$O— etc., or the group can represent the remainder of the molecule, for example $(M)_n(C_3N_3)$— in compounds of the structure $(M)_2(C_3N_3)$—$(C_3N_3)(M)_2$, as well as those structures linked together through carbon atoms, sulfur atoms, oxygen atoms, etc., as for example, (M)$_2$(C$_3$N$_3$)NHCH$_2$CH$_2$NH(C$_3$N$_3$)(M)$_2$ $(M)_2(C_3N_3)NHCH_2CH_2O(C_3N_3)(M)_2$ $(M)_2(C_3N_3)OCH_2CH_2O(C_3N_3(M)_2$ etc.

Thus, it may be seen that a wide variety of modified triazinyl vinyl compounds can be prepared in accordance with the practice of this invention and this modification is achieved by the nature of the Y radical, which can represent any monovalent radical. However, the Y radical is preferably hydrogen, hydrocarbon, halogen, R'''O—, R'''S—, R'''$_2$N—, wherein R''' is hydrogen or a hydrocarbon radical preferably of no more than 18 carbon atoms.

When one of the groups attached to the triazinyl ring contains a polymerizable ethylenic group which is not inhibited by the other atoms and groups in the monomer, then a soluble, or fusible, or soluble-fusible polymer is obtained on polymerizing the monomer. Such monomers can also be copolymerized with other monovinyl or monovinylidene monomers, hereinafter generally referred to as vinyl monomers, such as acrylonitrile, methyl methacrylate, etc., to produce modified thermoplastic compositions. It has now been discovered that when two or more polymerizable groups are attached to the triazine ring, insoluble, infusible, heat resistant, and in many cases self-extinguishing polymerization products are obtained. It has been further discovered that the triazinyl-vinyl monomers of this invention can be copolymerized with other monoolefinic and polyolefinic monomers to produce new materials having insolubility, infusibility, and heat resistance and valuable and characteristic properties that make them especially suitable for use in industry, for example, in molding, laminating, casting, coating, and adhesive applications, and for other purposes.

As disclosed in the aforementioned copending application, homopolymers of the triazinyl vinyl compounds can be produced as well as compositions of matter comprising an interpolymer (copolymer) or interpolymers of at least one triazinyl vinyl compound of this invention and at least one other polymerizable compound containing the structures or groupings, $$-CH=CH-, \ -CH=C\diagdown^\diagup, \ or \ CH_2=C\diagdown^\diagup$$

Various methods can be employed to produce the triazinyl vinyl monomers of this invention. One method of preparing these new monomers comprises effecting reaction between a halogenated triazine and MH, wherein M is the radical containing the polymerizable group as indicated above, which reaction is represented as follows, in each case using a hydrohalide acceptor such as sodium hydroxide: $(C_3N_3)Cl_3+3MH \rightarrow (C_3N_3)(M)_3+3HCl$.

When it is desired to modify the monomer by the presence of a Y group, this can be accomplished by first introducing the M group and then introducing the Y groups, for example: $(C_3N_3)Cl_3+2MH \rightarrow (M)_2(C_3N_3)Cl+2HCl$ and $(M)_2(C_3N_3)Cl+YH \rightarrow (M)_2(C_3N_3)Y+HCl$; or if the Y group is already attached to the triazine ring, then the M group can be attached, as for example:

$(Y)(C_3N_3)Cl_2+2MH \rightarrow (M)_2(C_3N_3)(Y)$ or the Y group can be introduced first, before introducing the M group, as for example:

$(C_3N_3)Cl_3+YH \rightarrow Y(C_3N_3)Cl_2+HCl$ and $Y(C_3N_3)Cl_2+2MH \rightarrow Y(C_3N_3)(M)_2+2HCl$ The reaction can be generalized further by the equation $(Y)_{3-n}(C_3N_3)(Cl)_n+nMH \rightarrow (Y)_{3-n}(C_3N_3)(M)_n$ and in the above equations halogen derivatives other than the chloride can also be used, and $n$, M and Y have the same meaning given hereinabove. These reactions can be carried out in an anhydrous liquid medium such as ether, benzene, dioxane, acetone, etc., or in water, or in mixtures of water with water-soluble solvents such as acetone, dioxane preferably in the presence of an hydrohalide acceptor such as sodium hydroxide, potassium hydroxide, sodium bicarbonate, sodium carbonate, pyridine, tributyl amine, etc., and at temperatures from below or about room temperature to temperatures corresponding to the refluxing temperature of the solvent or mixture of reactants.

Illustrative examples of halogenated triazine intermediates that can be used in the preparation of triazine monomers include the following:

$(C_3N_3)Cl_3;\ (C_3N_3)Br_3;\ (C_3N_3)I_3;\ HO(C_3N_3)Cl_2;\ HO(C_3N_3)Br_2$ $H_2N(C_3N_3)Cl_2;\ (CH_3)_2N(C_3N_3)Cl_2;\ (C_2H_5)_2N(C_3N_3)Cl_2$ $CH_3O(C_3N_3)Cl_2;\ C_2H_5O(C_3N_3)Br_2;\ CH_2=CHCH_2O(C_3N_3)Cl_2$ $CH_2=CCH_2-(C_3N_3)Cl_2;\ H(C_3N_3)Cl_2;\ C_2H_5(C_3N_3)Cl_2$
$\quad\quad |$
$\quad\quad CH_3$

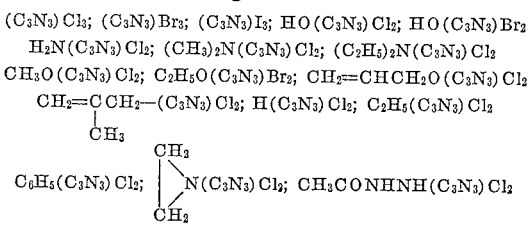

$C_2H_5CONHCH_2CH_2NH(C_3N_3)Cl_2;\ C_3H_2COOCH_2CH_2O(C_3N_3)Cl_2$ $(CH_3O)_2PO(C_3N_3)Cl_2;\ (CH_2=CHCH_2O)PO(C_3N_3)Cl_2$ $ClC_6H_4NH(C_3N_3)Cl_2;\ CH_3OC_6H_4NH(C_3N_3)Cl_2$ $CH_3OOCC_6H_4(C_3N_3)Cl_2;\ H_3COOCCH_2NH(C_3N_3)Cl_2$ $H_2NO_2SC_6H_4NH(C_3N_3)Cl_2;\ CH=CCH_2O(C_3N_3)Cl_2$

These intermediates can be prepared by various methods reported in the literature for replacing the halogen atoms in halo triazines, such as cyanuric chloride, with various groups such as hydrocarbon groups, alkoxy, aryloxy, substituted amino groups, mercapto, alkylthio, hydroxy, hydrogen, etc. By using the appropriate reagents with such halo-triazines, the various intermediates desired for preparing the compounds of this invention can be prepared following procedures taught in the following references.

For introducing NR'$_2$ groups:

Thurston et al.: Journ. of American Chemical Soc., 73, 2981 (1951);
Thurston et al.: Journ. of American Chemical Soc., 73, 2992 (1951);
Cuthbertson et al.: J. Chem. Soc., 1948, 561;
Diels et al.: Ber., 3191 (1903);
Friedheim: J.A.C.S., 66, 1775 (1944);
Pearlman et al.: J.A.C.S., 70, 3726 (1948).

For introducing hydrocarbon-oxy groups:

Dudley et al.: J.A.C.S., 73, 2986 (1951);
Diels et al.: Ber., 36, 3191 (1903);
Hoffman: Ber., 19, 2061 (1886);
D'Alelio: U.S. Patent 2,295,562;
Schaefer et al.: J.A.C.S., 73, 2990 (1951).

For introducing hydroxy groups:

Klason: J. prakt. Chem., (2) 34, 152 (1886);
Finger: J. prakt. Chem., (2) 75, 103 (1907).

For introducing sulfide and mercapto groups:

Klason: J. prakt. Chem., (2) 34, 152 (1886);
Hoffman: Ber., 18, 2196 (1885);
Ciba British Patent 318,275 (1930);
D'Alelio et al.: U.S. Patents 2,295,561 and 2,295,562.

For introducing hydrocarbon groups:

Hentrich et al.: U.S. Patent 1,911,689;
Ostrogovich: Chem. Ztg., 36, 738 (1912);
Kracker et al: U.S. Patent 2,273,115.

For introducing hydrogen:

Ber.: 32, 691 (1899);
Hirt et al.: Helv. chim. Acta, 33, 1365 (1950).

Illustrative examples of the MH compounds that can be used in the preparation of triazine monomers include:

$HOCH_2CH_2OCOOCH_2CH=CH_2$ $HOCH_2CH_2NHCOOCH_2CH=CH_2$

HO(CH₂)₄OCOOCH₂C=CH₂; HO(CH₂)₄OCOOCHCH=CH₂
          |                              |
          CH₃                            CH₃

HOC₆H₄NHCOOCH₂CH=CH₂; HOC₆H₄OCOOCH=CH₂
NH₂C₆H₄NHCOOCH₂C=CH₂; NH₂(CH₂)₆NHCOOC=CH₂
          |                              |
          CH₃                            CH₃

NH₂(CH₂)₃OCOOCH=CH₂; NH₂C₆H₁₀NHCOOCH₂CH=CH₂
HO(CH₂)₃NHCOOCH₂CH=CH₂; HOC₆H₁₀OCOOC=CH₂
                                     |
                                     CH₃

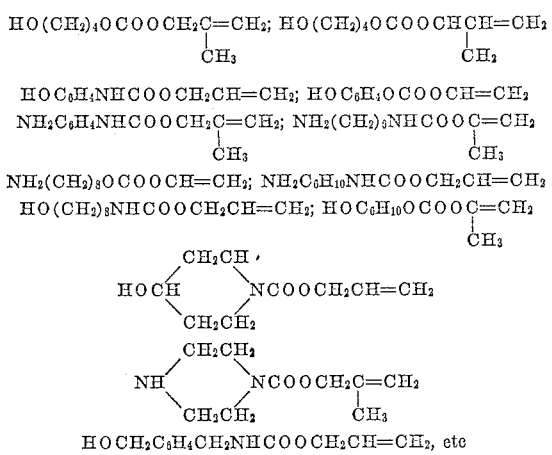

HOCH₂C₆H₄CH₂NHCOOCH₂CH=CH₂, etc

The monomers of this invention can also be prepared by acylating intermediates of the formula $$(Y)_{3-n}(C_3N_3)(A-Z-AH)_n$$

with an unsaturated ester of chloroformic acid, e.g., $(C_3N_3)(OCH_2CH_2OH)_2+3ClCOOCH_2-CH=CH_2$
$\rightarrow (C_3N_3)(OCH_2CH_2OCOOCH_2-CH=CH_2)_3$ $(Y)_{3-n}(C_3N_3)(NHCH_2CH_2OH)_n$
$+nClCOOCH_2CH=CH_2$
$\rightarrow (Y)_{3-n}(C_3N_3)(NHCH_2CH_2OCOCH_2-CH=CH_2)_n$ and $(Y)_{3-n}(C_3N_3)(NHC_6H_4NH_2)_n+nClCOOCH_2CH=CH_2$
$\rightarrow (Y)_{3-n}(C_3N_3)(NHC_6H_4NHCOOCH_2-CH=CH_2)_n$ The above reactions are performed in the presence of a hydrohalide acceptor such as pyridine, tributyl amine, sodium hydroxide, etc., and are usually performed at temperatures below 100° C. and preferably in the presence of a polymerization inhibitor.

This invention will be more fully described by the following examples. The invention is not to be regarded, however, as restricted in any way by these examples and they are to serve merely as illustrations. In these examples as well as throughout the specification, "parts" and "percentages" shall mean parts by weight and percentages by weight unless specifically provided otherwise.

EXAMPLE I

Preparation of Triazine Monomers

To a mixture of 26 parts of tris(hydroxyethyl)melamine, $C_3N_3(NHCH_2CH_2OH)_3$, and 56 parts of tributyl amine in 150 parts of water, in a flask equipped with means for refluxing, is added slowly and with stirring 36 parts of allyl chlorocarbonate, $ClCOOCH_2CH=CH_2$, in 25 parts of acetone. Upon completion of the addition of the chloride, one part of 2,6-ditertiarybutyl-para cresol is added and the mixture refluxed for one hour and allowed to cool to room temperature. The water is then removed by filtration or decantation. The monomer is washed with water and recrystallized from acetone-water mixtures. There is obtained $$(C_3N_3)(NHCH_2CH_2OCOOCH_2CH=CH_2)_3$$

Ultimate analyses for carbon, hydrogen, nitrogen, and molecular weight determination give values of 49.0%, 5.84%, 16.25%, and 508.8 respectively, all of which are in close agreement with the theoretical values. Substitution of an equivalent amount of $$(C_4H_9)_2N(C_3N_3)(NHCH_2CH_2OH)_2$$

for the trihydroxy compound, yields the corresponding monomer, $$(C_4H_9)_2N(C_3N_3)(NHCH_2CH_2OCOOCH_2CH=CH_2)_2$$

which, on analyses gives values of 55.8% carbon, 7.63% hydrogen, 16.86% nitrogen, and a molecular weight of 492.76, all of which values are in close agreement with the theoretical values.

When equivalent quantities of $$(CH_3O)(C_3N_3)(NHCH_2CH_2OH)_2$$

are used in the foregoing procedure, there is obtained $$(CH_3O)(C_3N_3)(NHCH_2CH_2OCOOCH_2CH=CH_2)_2$$

which, on analyses gives values of 48.26% carbon, 5.55% hydrogen, 17.49% nitrogen, and a molecular weight of 553.6, all of which values are in close agreement with the theoretical values. The use of $$CH_2=CH-CH_2O(C_3N_3)(NHCH_2CH_2CH_2OH)_2$$

in the above procedure yields $$CH_2=CHCH_2O(C_3N_3)(NHCH_2CH_2CH_2OCOOCH_2CH=CH_2)_2$$

When, instead of the hydroxy compounds, amino compounds are used in the above procedures, e.g., $$(C_3N_3)(NHC_6H_4NH_2)_3$$

the corresponding carbamates are obtained, e.g., $$(C_3N_3)(NHC_6H_4NHCOOCH_2CH=CH_2)_3$$

Alternately using the same procedures, the triazine monomers are also prepared by using a cyanuric chloride and an hydroxy alkyl carbamic ester. For example, $(C_3N_3)Cl_3$ with $3HOCH_2CH_2OCOOCH_2CH=CH_2$ in the presence of a hydrohalide acceptor yields $$(C_3N_3)(OCH_2CH_2OCOOCH_2CH=CH_2)_3$$

whereas $3HOCH_2CH_2NHCOOCH_2CH=CH_2$ yields $$(C_3N_3)(OCH_2CH_2NHCOOCH_2CH=CH_2)_3$$

and instead of cyanuric chloride, any dichloride, such as $Y(C_3N_3)Cl_2$ can be used to give the corresponding diderivative. Instead of the specific chlorocarbonates mentioned above, other chlorocarbonates, such as ClCOOCH₂C=CH₂,  ClCOOCH—CH=CH₂
          |                    |
          CH₃                  CH₃ etc., can be used to give the corresponding derivatives.

By these procedures, various triazine monomers of this invention are prepared, including those which have the following formulas:

C₃N₃(OCH₂CH₂OCOOCH₂CH=CH₂)₃
C₃N₃(NHCH₂CH₂OCOOCH₂CH=CH₂)₃
C₃N₃(NHCH₂CH₂NHCOOCH₂CH=CH₂)₃
C₃N₃(OCH₂CH₂NHCOOCH₂CH=CH₂)₃
CH₃O—C₃N₃(OCH₂CH₂OCOOCH₂CH=CH₂)₂
(C₄H₉)₂N—C₃N₃(NHCH₂CH₂OCOOCH₂C=CH₂)₂
                                    |
                                    CH₃
(C₆H₅)₂N—C₃N₃(NHCH₂CH₂OCOOCH₂CH=CH₂)₂
Cl—C₃N₃(NHC₆H₄NHCOOCH₂CH=CH₂)₂
CH₂=CHCH₂OOCOCH₂O—C₃N₃(OC₆H₄OCOOCH₂CH=CH₂)₂
CH₂=CHCH₂O—C₃N₃(NHC₆H₁₀OCOOCHCH=CH₂)₂
                                      |
                                      CH₃
C₃N₃(OC₆H₁₀OCOOCH=CH₂)₂
CH=C—CH₂O—C₃N₃(OCH₂CH₂OCOOC=CH₂)₂
                                |
                                CH₃
C₆H₅O—C₃N₃(OC₆H₁₂OCOOCH=CH₂)₂
Cl—C₃N₃—NHCH₂CH₂OCOOCH₂CH=CH₂
       |
       C₆H₅
CH₂=CHCH₂O—C₃N₃—NHCH₂CH₂NHCOOCH₂CH=CH₂
                |                        |
                Cl                       CH₃
ClC₃N₃(NHCH₂CH₂OCOOCH₂CH=CH₂)₂
C₆H₁₁O—C₃N₃—NCH₂CH₂CH₂NHCOOCH₂C=CH₂
       |     |                        |
       C₃H₇  CH₃                      Cl
ClC₃N₃(OCH₂CH₂OCOOCH₂CH=CH₂)₂
Cl₂C₃N₃NHC₆H₄NHCOOCH₂CH=CH₂
Cl₂C₃N₃OC₆H₄OCOOCH₂CH=CH₂

$Cl_2C_3N_3$—$OCH_2C_6H_4OCOOCH_2C$=$CH_2$
                                    |
                                    $C_6H_5$ $C_6H_5S$—$C_3N_3$—$OCH_2CH_2OCOOCH_2CH$=$CH_2$
          |
          $Cl$ $Cl_2C_3N_3OCH_2CH_2OCOOCH_2CH$=$CH_2$ $C_3N_3(OCH_2CH_2OCOOCH$=$CH_2)_3$ $Cl_2C_3N_3NHCH_2CH_2NHCOOCH_2CH$=$CH_2$

The compounds of this invention can also be used as intermediates for the preparation of new compounds which have utility other than in the preparation of polymers. As an example these compounds can be halogenated to produce the chloro or bromo derivatives, etc., as illustrated by the reaction conducted, for example, in carbon tetrachloride:

$CH_3OC_3N_3$—$OCH_2CH_2OCOOCH_2CH$=$CH_2$+$Br$→
       |
       $Cl$ $\qquad CH_3OC_3N_3OCH_2CH_2OCOOCH_2CHBrCH_2Br$
       |
       $Cl$ When the monomer has 2 or 3 unsaturated groups the halogenation can be limited by using the appropriate stoichiometric amount of halogen so as to leave one or two such unsaturated groups and give a product which can be polymerized, such as $Cl$—$C_3N_3$—$OCH_2CH_2OCOOCH_2CHClCH_2Cl$
        |
        $OCH_2CH_2OCOOCH_2CH$=$CH_2$ and $CH_2$=$CHCH_2OOCOCH_2CH_2OC_3N_3$
$\qquad (OCH_2CH_2OCOOCH_2CHBrCH_2Br)_2$ Polymers and copolymers prepared from such compounds have built-in flame resistance. The corresponding compounds in which the unsaturation has been completely halogenated can be used as modifiers for polymers to give plasticity and improve their flame resistance.

Other typical halogenated compounds of this invention are:

$C_3N_3(OCH_2CH_2OCOOCH_2CHClCH_2Cl)_3$ $C_3N_3(OCH_2CH_2OCOOCH_2CHBrCH_2Br)_3$ $CH_2CH$=$CH_2OOCOCH_2CH_2C_3N_3(CH_2CH_2OCOOCH_2CHClCH_2Cl)_2$ $Cl$—$C_3N_3NHCH_2CH_2NHCOOCH_2CHClCH_2Cl$
       |
       $C_3N_3NHCH_2CH_2NHCOOCH_2CH$=$CH_2$ $Cl$—$C_3N_3OC_6H_4OCOOCH_2CH$=$CH_2$; etc.
       |
       $OC_6H_4OCOOCH_2CHClCH_2Cl$ The unsaturated compounds of this invention can also be epoxidized with $H_2O_2$ and an acid according to well known procedures to give compounds such as $ClC_3N_3(OC_6H_4OCOOCH_2CH$—$CH_2)_2$
                              \  /
                               O $ClC_3N_3$—$OC_6H_4OCOOCH_2CH$=$CH_2$
       |
       $OC_6H_4OCOOCH_2CH$—$CH_2$
                            \  /
                             O These derivatives can be used as intermediates in the preparation of adhesives and for the preparation of varnishes, paints, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The triazine compound of the formula $$Y_{3-n}\left[\begin{array}{c} C \\ N \quad N \\ -C \quad C- \\ N \end{array}\right]\left[A-Z-A-COO(CR''_2)_m-CR''=CH_2\right]_n$$

wherein:

$n$ is an integer having a value of at least 1 and no more than 3;

A is selected from the class consisting of O and NR′, wherein R′ is of no more than 12 carbon atoms and is selected from the group consisting of alkyl, aryl having benzene nuclei, and cycloalkyl having 5–7 carbon atoms in the cyclic ring;

Z has no more than 18 carbon atoms and is selected from the class consisting of alkylene, cyclohexylene, alkenylene, phenylene, naphthylene, diphenylene, diphenyleneoxide, diphenylenesulfide, and diphenyleneamine radicals and derivatives thereof having only one derivative group and said derivative group is selected from the class consisting of chloro, fluoro, alkoxy, aryloxy having benzene nuclei, cyclohexyloxy, cyclohexenyloxy, alkenoxy and hydrocarbon carboxylic acyloxy groups;

R″ is selected from the class of hydrogen, halogen and hydrocarbon of no more than 10 carbon atoms;

$m$ is an integer having a value of at least 0 and no more than 1;

Y has no more than 18 carbon atoms and is selected from the class consisting of hydrogen, hydrocarbon, halogen, —OR‴, —NR‴$_2$, —SH‴, alkenyl, alkyl, aryl of benzene nuclei, cyclohexyl, cyclopentyl and amino; and R‴ is selected from the class consisting of hydrogen and hydrocarbon having no more than 8 carbon atoms.

2. The triazine compound of the formula,
$C_3N_3(NHCH_2CH_2OCOOCH_2CH$=$CH_2)_3$ 3. The triazine compound of the formula,
$(C_4H_9)_2NC_3N_3(NHCH_2CH_2OCOOCH_2CH$=$CH_2)_2$ 4. The triazine compound of the formula,
$CH_3OC_3N_3(NHCH_2CH_2OCOOCH_2CH$=$CH_2)_2$ 5. The triazine compound of the formula,
$CH_2$=$CHCH_2OC_3N_3$
$\qquad (NHCH_2CH_2CH_2OCOOCH_2CH$=$CH_2)_2$ 6. The triazine compound of the formula,
$C_3N_3(NHC_6H_4NHCOOCH_2CH$=$CH_2)_3$ 7. The triazine compound of the formula,
$C_3N_3(OCH_2CH_2OCOOCH_2CH$=$CH_2)_3$ 8. The triazine compound of the formula,
$C_3N_3(OCH_2CH_2NHCOOCH_2CH$=$CH_2)_3$ 9. The triazine compound of the formula,
$ClC_3N_3(NHCH_2CH_2OCOOCH_2CH$=$CH_2)_2$ 10. The triazine compound of the formula,
$ClC_3N_3(NHC_6H_4NHCOOCH_2CH$=$CH_2)_2$ 11. The triazine compound of the formula,
$C_3N_3(NHCH_2CH_2NHCOOCH_2CH$=$CH_2)_3$ 12. The triazine compound of the formula,
$ClC_3N_3(OCH_2CH_2OCOOCH_2CH$=$CH_2)_2$ 13. The triazine compound of the formula,
$Cl_2C_3N_3(OCH_2CH_2OCOOCH_2CH$=$CH_2)$ 14. The triazine compound of the formula,
$Cl_2C_3N_3NHCH_2CH_2NHCOOCH_2CH$=$CH_2$ 15. The triazine compound of the formula,
$Cl_2C_3N_3NHC_6H_4NHCOOCH_2CH$=$CH_2$ 16. The triazine compound of the formula,
$Cl$—$C_3N_3$—$OCH_2CH_2OCOOCH_2CHClCH_2Cl$
        |
        $OCH_2CH_2OCOOCH_2CH$=$CH_2$ 17. The triazine compound of the formula,
$$CH_2=CHCH_2OOCOCH_2CH_2OC_3N_3(OCH_2CH_2OCOOCH_2CHBrCH_2Br)_2$$

18. The triazine compound of the formula,
$$C_3N_3(OCH_2CH_2OCOOCH_2CHClCH_2Cl)_3$$

19. The triazine compound of the formula,
$$C_3N_3(OCH_2CH_2OCOOCH_2CHBrCH_2Br)_3$$

20. The triazine compound of the formula,
$$\begin{array}{l}Cl-C_3N_3-NHCH_2CH_2NHCOOCH_2CHClCH_2Cl\\ \phantom{Cl-C_3N_3-}NHCH_2CH_2NHCOOCH_2CH=CH_2\end{array}$$

References Cited by the Examiner
UNITED STATES PATENTS 2,993,877  7/61  D'Alelio _____ 260—249.5 X
3,056,760  10/62  D'Alelio _____ 260—248 X IRVING MARCUS, *Primary Examiner.*
JOHN D. RANDOLPH, NICHOLAS S. RIZZO,
*Examiners.*